2,898,363

ISOCYANATO-MUSTARD OILS

Günther Nischk, Leverkusen, Germany, assignor, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Application November 17, 1955
Serial No. 547,553

Claims priority, application Germany November 19, 1954

4 Claims. (Cl. 260—454)

This invention relates to aliphatic and cycloaliphatic isocyanato-mustard oils and to a process for preparing the same.

The only compounds containing both an isocyanate group and an isothiocyanate group in the molecule which have hitherto been described are isolated compounds of the aromatic series. They were obtained by complicated methods, such as for example, by the action of aromatic isothiocyanatocarboxylic acid chlorides on sodium azide and Curtius rearrangement of the reaction products into the corresponding isocyanates.

It is an object of the present invention to provide aliphatic and cycloaliphatic isocyanato-mustard oils. Another object is to provide a convenient and economical process for preparing aliphatic and cycloaliphatic isocyanato-mustard oils from inexpensive starting materials. Further objects will appear hereinafter.

It has now been found that aliphatic and cycloaliphatic isocyanato-mustard oils can be conveniently produced by reacting the intramolecular ammonium salts of the corresponding dithiocarbamic acids with phosgene. The reactions involved in the process of the invention can be represented by the following general equations in which R is an alkylene or cycloalkylene radical:

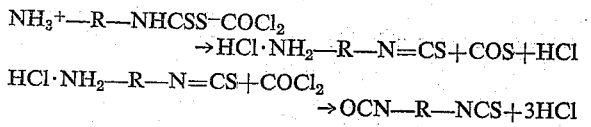

The preparation of the intramolecular ammonium salts of the aliphatic and cycloaliphatic dithiocarbamic acids serving as starting materials for the process of the invention has not yet been described in the literature; but it has now been found that these salts may be prepared by the action of 1 mol of carbon disulfide on about 1 mol of an aliphatic or cycloaliphatic diamine. In case the intramolecular ammonium salt of the corresponding bis-dithiocarbamic acid of the general formula

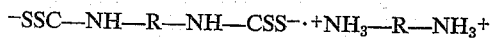

should primarily be formed in the reaction, a rearrangement, most easily by heating, is carried out to convert this salt into the intramolecular ammonium salt.

When carrying out the process of the invention, it is advantageous to initially introduce phosgene at a low temperature, such as for example 0° C., into a suspension of the intramolecular ammonium salt of the dithiocarbamic acid in an inert diluent. After removal of the cooling means, the mixture will generally heat up with strong evolution of hydrogen chloride. If the temperature does not rise by itself, it is advisable to heat the mixture to a slightly elevated temperature, say to about 25° to 60° C., to thereby remove part of the hydrogen chloride formed in the reaction. The phosgenation is preferably completed at a temperature ranging from about 120° to 160° C. The diisocyanate corresponding to the desired isocyanato-mustard oil is usually formed as a by-product, but the two compounds can easily be separated by vacuum distillation.

The reaction of ammonium salts of bis-dithiocarbamic acids with phosgene, which is described in the literature, leads to the formation of dithiocyanates with splitting off of ammonium chloride and basically differs from the reaction forming the basis of the process of the invention.

The isocyanato-mustard oils of the invention are suitable for use in the production of plastics since they are chemically related to the corresponding diisocyanates and may undergo analogous reactions with compounds containing reactive hydrogen atoms. Thus, the new isocyanato-mustard oils may be reacted with glycols, diamines, polyesters containing free hydroxyl groups, glycol polyethers and glycol polythioethers to form polyurethane plastics, which depending upon the reaction conditions used, will have the form of rubber-like materials, elastic foamed materials, rigid foamed materials, lacquers, coatings, films, etc.

The following examples illustrate methods of carrying out the present invention, but it is to be understood that these examples are given by way of illustration and not of limitation.

Example 1

116 parts of hexamethylene diamine are dissolved in 1 liter of dichlorobenzene. 80 parts of carbon disulfide are thereafter added dropwise at 40° C. After having been stirred for 24 hours at 48 to 50° C., the mixture is cooled to 0° C. and 150 parts of phosgene are introduced. After removing the cooling means, the temperature rises to 50° C. At the same time, relatively large amounts of hydrogen chloride are evolved. When the temperature starts to drop, the mixture is heated to 140° C. while introducing phosgene until a clear solution has formed. The excess of phosgene is removed by blowing with nitrogen, and the solution is clarified with active carbon and concentrated by evaporation in vacuo.

The following two fractions are obtained:

(1) Hexamethylene diisocyanate; B.P. 85–90° C./.5 mm.; yield 30 parts.

(2) 1.6-hexamethylene isocyanato-mustard oil; B.P. 110° C./0.5 mm.; yield 140 parts.

Example 2

180 parts of tetramethylene diamine are dissolved in 2 liters of dichlorobenzene. 160 parts of carbon disulfide are added dropwise while stirring and taking care that the temperature does not exceed 40° C. The mixture is thereafter stirred for 48 hours at 60–65° C. 250 parts of phosgene are now introduced at 0° C., the cooling means is removed and the temperature is allowed to rise again. Hydrogen chloride is violently evolved. The phosgenation is completed by introducing phosgene at a temperature of 140° C. The reaction mixture is worked up as described in Example 1.

The following two fractions are obtained:

(1) Tetramethylene diisocyanate; B.P. 65° C./0.5 mm.; yield 65 parts.

(2) 1,4-tetramethylene isocyanato-mustard oil; B.P. 96–100° C./0.55 mm.; yield 160 parts.

Example 3

A solution of 116 parts of hexamethylene diamine in 200 parts of alcohol is added dropwise at 20° C. while stirring to a mixture of 370 parts of carbon disulfide and 400 parts of benzene. The mixture is stirred for 14 hours at room temperature, filtered with suction and the residue washed with benzene. After drying for a short time at room temperature the residue is taken up in 1 liter of dichlorobenzene, and 200 parts of phosgene are introduced at 0° C. The mixture is then gradually heated to a temperature of 40° C. Hydrogen chloride is evolved and the solid suspension changes into a resinous mass, which however solidifies later. When the evolution of hydrogen chloride subsides, the mixture is gradually heated to 140° C. while introducing more phosgene, until a clear solution is obtained. Excess phosgene is then removed by blowing with nitrogen, the solution is decolorized with active carbon and then distilled in a water-jet vacuum. The liquid residue is rectified under high vacuum through a column.

The following fractions are collected:
(1) Hexamethylene diisocyanate (yield 35 parts), B.P. 0.8:80° C.
(2) 1,6-hexamethylene isocyanato-mustard oil (yield 140 parts), B.P. 0.8:115–120° C.

*Example 4*

A solution of 170 parts of hexahydro-p-phenylene diamine in 200 parts of alcohol is added dropwise to a thoroughly stirred mixture of 550 parts of carbon disulfide in 500 parts of benzene. The mixture is stirred for 14 hours at room temperature, filtered with suction and the residue washed with benzene. After drying in a desiccator, the residue is taken up in 1 liter of dichlorobenzene and 300 parts of phosgene are introduced at 0° C. The mixture is allowed to stand and, when the temperature has risen to 25° C. with evolution of hydrogen chloride, it is gradually heated to 140° C. while introducing phosgene and stirred until a clear solution is formed. Excess phosgene is removed by introducing nitrogen. After being clarified with active carbon, the dichlorobenzene is removed in a water-jet vacuum and the residue is distilled under high vacuum through a column.

The following fractions are collected:
(1) Hexahydro-p-phenylene diisocyanate; 60 parts; B.P. 0.8:85–90° C.
(2) 4-isocyanato-hexahydrophenyl-mustard oil

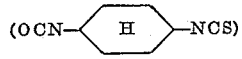

110 parts; B.P. 0.8:116–120° C.

*Example 5*

65 parts of 1.6-hexamethylene isocyanato-mustard oil are mixed with 100 parts of an unsaturated polyester with an OH number of 200, prepared from 3 mols of maleic acid, 3 mols of ethylene glycol and 1 mol of trimethylol propane by thermal condensation at a temperature of 180–220° C. Reaction is achieved at a temperature of 125° C. while stirring for 1 hour. 0.75 part of hydroquinone and 95 parts of styrene are then added to the resulting unsaturated polyester containing free NCS groups.

At a later stage 40 parts of 4,4'-diamino-diethyl-diphenyl methane and 10 parts of cumol peroxide are admixed to the stable intermediate, and the mixture is polymerized at a temperature of 100° C. whereby a transparent resin is obtained.

The above description and examples are intended to be illustrative only. Any modification of or variation therefrom which conforms to the spirit of the invention is intended to be included within the scope of the claims.

What is claimed is:

1. Process for producing isocyanato-mustard oils which comprises reacting phosgene with an intramolecular ammonium salt of a dithiocarbamic acid of the general formula $NH_3^+$—R—$NHCSS^-$ in which R is a member selected from the group consisting of alkylene and cycloalkylene radicals.

2. Process for producing isocyanato-mustard oils which comprises introducing phosgene at a temperature around 0° C. into a suspension in an inert diluent of an intramolecular ammonium salt of a dithiocarbamic acid of the general formula $NH_3^+$—R—$NHCSS^-$ in which R is a member selected from the group consisting of alkylene and cycloalkylene radicals, continuing the reaction at slightly elevated temperature to thereby remove part of the hydrogen chloride formed, heating the reaction mixture at a temperature ranging from about 120° to 160° C. while introducing phosgene, and recovering an isocyanato-mustard oil.

3. Process for producing isocyanato-mustard oils which comprises bringing together about equimolecular proportions of carbon disulfide and a diamine having the general formula $H_2N$—R—$NH_2$ in which R is a member selected from the group consisting of alkylene and cycloalkylene radicals to thereby form the intramolecular ammonium salt of a dithiocarbamic acid of the general formula $NH_3^+$—R—$NHCSS^-$ in which R is a member selected from the group consisting of alkylene and cycloalkylene radicals, reacting said intromolecular ammonium salt with phosgene in the presence of an inert diluent at a temperature around 0° C., continuing the reaction at slightly elevated temperature to thereby remove part of the hydrogen chloride formed, heating the reaction mixture at a temperature ranging from about 120° to 160° C. while introducing phosgene, and recovering an isocyanato-mustard oil.

4. A method for making an isocyanato-mustard oil which comprises introducing phosgene into a suspension of an ammonium salt of a dithiocarbamic acid selected from the group consisting of aliphatic and cycloaliphatic dithiocarbamic acids at a temperature of about 0° C., removing hydrogen chloride, heating the reaction mixture to a temperature within a range of about 120° C. to about 160° C. while continuing to introduce phosgene and remove hydrogen chloride, and thereafter recovering the resulting isocyanato-mustard oils.

References Cited in the file of this patent

UNITED STATES PATENTS

| | | |
|---|---|---|
| 2,374,136 | Rothrock | Apr. 17, 1945 |
| 2,511,310 | Upson | June 13, 1950 |
| 2,548,741 | Sayre | Apr. 10, 1951 |
| 2,681,358 | Wirth | June 14, 1954 |
| 2,728,787 | Hurwitz et al. | Dec. 27, 1955 |

FOREIGN PATENTS

| | | |
|---|---|---|
| 656,643 | Great Britain | Aug. 29, 1951 |

OTHER REFERENCES

Siefken: Justus Liebigs Annalen der Chemie, vol. 562 (1949), pp. 116 and 117.